(12) United States Patent
Yamanaka

(10) Patent No.: US 6,511,697 B1
(45) Date of Patent: Jan. 28, 2003

(54) METHOD OF USING GERMINATED BROWN RICE

(76) Inventor: Senya Yamanaka, 39-128, Marunouchi, Ueno-shi, Mie-ken (JP), 518-0873

( * ) Notice: Subject to any disclaimer, the term of this patent is extended or adjusted under 35 U.S.C. 154(b) by 0 days.

(21) Appl. No.: 09/679,051

(22) Filed: Oct. 4, 2000

(30) Foreign Application Priority Data

Aug. 8, 2000 (JP) ........................................ 2000-256805

(51) Int. Cl.[7] ............................................... A23L 1/182
(52) U.S. Cl. ..................... 426/618; 426/144; 426/507; 426/508; 426/524; 426/636
(58) Field of Search ................... 426/618, 144, 426/636, 507, 508, 524

(56) References Cited

U.S. PATENT DOCUMENTS

| 4,276,321 A | * | 6/1981 | Nagatani ..................... 426/618 |
| 5,356,642 A | * | 10/1994 | Patterson et al. ............. 426/93 |
| 5,862,627 A | * | 1/1999 | Jang ........................... 426/618 |

FOREIGN PATENT DOCUMENTS

| JP | 403206858 | * | 9/1991 | ................. 426/618 |
| JP | 406245697 | * | 9/1994 | ................. 426/618 |
| JP | 406303926 | * | 11/1994 | ................. 426/508 |
| JP | 411266806 | * | 10/1999 | |

* cited by examiner

*Primary Examiner*—Helen Pratt
(74) *Attorney, Agent, or Firm*—Wenderoth, Lind & Ponack, L.L.P.

(57) ABSTRACT

The present invention relates to a method of using germinated brown rice, a germinated brown rice processed food, a brown rice germination apparatus and a germinated brown rice filling apparatus. Germinated brown rice is boiled and steamed. The germinated brown rice boiled or steamed is boiled together with polished rice. The germinated brown rice is preserved while being frozen or sealed in a container or a bag. The germination apparatus conducts germination by dipping the germinated brown rice in tourmaline ore water. The filling apparatus moves a container supported by guide rails and allows the container to pass below a hopper into which the germinated brown rice is inputted, thereby automatically filling the germinated brown rice in a storage recessed portion of this container.

1 Claim, 11 Drawing Sheets

METHOD OF USING GERMINATED BROWN RICE

BACKGROUND OF THE INVENTION

1. Field of the Invention

The present invention relates to a method of using germinated brown rice which can be boiled together with polished rice, a germinated brown rice processed food, a germination apparatus for obtaining germinated brown rice from brown rice and a filling apparatus for filling germinated brown rice in a container.

2. Description of the Related Art

It is known that germinated brown rice has excellent advantages including overcoming unpleasantness in eating brown rice, containing about four times as much dietary fiber as polished rice, containing more amino acid and vitamin B groups to thereby promote health and help constipated persons considerably.

It is also known that nutriment is activated and saccharification hormone is produced by germinating brown rice, so that albumen starch is decomposed to thereby increase sweet and smell.

Normally, germinated brown rice is eaten by boiling a mixture of a proper amount of germinated brown rice with polished rice. If a proper amount of brown rice is mixed with polished rice and boiled, however, the boiled mixture is sometimes disadvantageously difficult to eat because of the great difference in softening degree between the boiled brown rice and the boiled polished rice and making a person feel palatably unpleasant.

This problem can be overcome to some extent by lengthening boiling time to soften the germinated brown rice. However, a household rice cooker does not have a function to lengthen boiling time. Due to this, it is true in present situation that germinated rice cannot be easily eaten.

Further, the germinated brown rice produced by an electric germinator is live brown rice with sprouts put out. For that reason, if the germinated brown rice thus produced is left for a while, the nutrient thereof greatly declines as rhizogenes is progresses.

Considering this, even if preserved in a refrigerator, the germinated brown rice is fermented to continue germination and the nutrient thereof greatly decline as well the rice gets moldy, resulting in disposal. This is the main cause of the less spread of eating germinated brown rice.

Further, when brown rice is germinated using a well-known germinator, a great amount of foam is generated and the foam overflows the container of the germinator. Overflowing yellow foam soils the surroundings, thereby disadvantageously making cleaning time longer.

SUMMARY OF THE INVENTION

It is, therefore, first object of the present invention to provide a method of using germinated brown rice and a germinated brown rice processed food which allow palatably eating germinated brown rice without giving the peculiar difference in palate of the germinated brown rice from polished rice, easily processing and boiling the germinated brown rice by a microwave oven or eating boiled germinated brown rice mixed with polished rice and preserving the germinated brown rice.

It is second object of the present invention to provide a germination apparatus capable of suppressing foam being generated when germinating brown rice as much as possible without soiling the surroundings.

It is third object of the present invention to provide a germinated brown rice filling apparatus which allows quite easy, prompt operation of filling germinated brown rice in a container and avoiding making filled quantity uneven.

The above and other objects and features of the present invention will be readily apparent by the reading of the description given hereinafter in conjunction with the accompanying drawings given for illustrative purposes.

DESCRIPTION OF THE PREFERRED EMBODIMENTS

Figure 1:
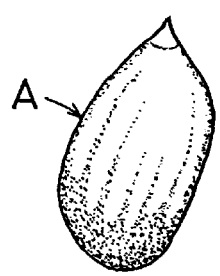
FIG. 1 is a front view of germinated brown rice used in the present invention.
Figure 2:
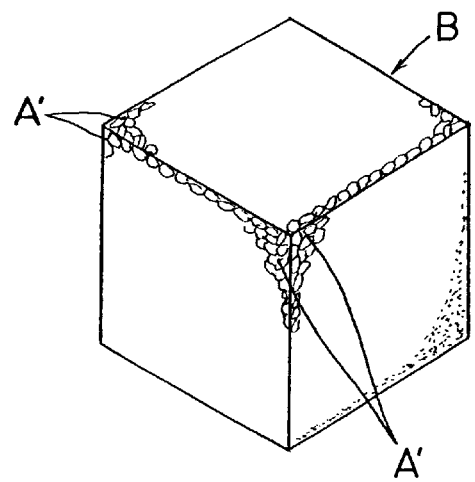
FIG. 2 is a perspective view of a block body which is a germinated brown rice processed food.

FIG. 1 shows germinated brown rice A, which is produced by germinating brown rice using, for example, a well-known electric germinator or a germination apparatus according to the present invention to be described later.

First Embodiment

A desired amount of germinated brown rice A as well as water is put in a rice cooker (not shown) and boiled therein. The boiled germinated brown rice A' is formed into a fixed amount of small block and many block bodies B are made.

It is noted that a heat processing may be conducted to the germinated brown rice A not by boiling but steaming the rice A.

To make the above-stated block body B, the boiled germinated brown rice A' is inputted in an uneven tray (not shown) such as an ice making tray and the upper surface of the rice A' is pressed by a spatula or a plate to thereby flatten the rice A'.

Next, a block partition frame having vertically and horizontally aligned partition plates assembled thereinto is forced into the boiled or steamed germinated brown rice A' in the tray to thereby divide the rice A' into blocks. The divided blocks B are taken out from the tray, frozen and preserved while stored in a bag or the like.

Second Embodiment

Figure 3:
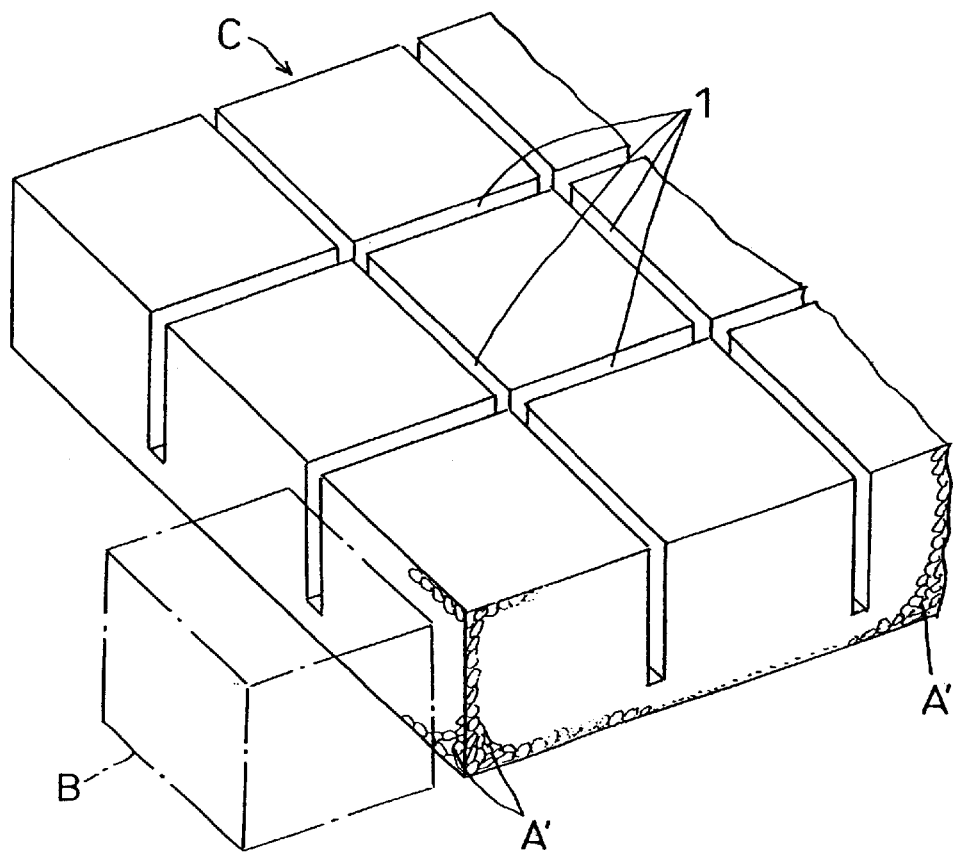
FIG. 3 is a perspective view of a frozen plate body which is a germinated brown rice processed food.

As shown in FIG. 3, the boiled or steamed germinated rice A' is formed into a plate body C of predetermined thickness and planar size.

To form this plate body C, boiled or steamed brown rice A' is put into a tray-like container and the upper surface of the rice A' is pressed and flattened by a spatula or a pressure plate as in the case of the first embodiment.

Next, using a slit blade (not shown) having either columns only or a combination of columns and ranks, slits 1 are formed in the plate body C for division purposes.

The depth of each slit 1 may be appropriately chosen such as about half the thickness of the plate.

Then, the plate body C can be divided into a plurality of block bodies B as indicated by chain lines shown in FIG. 3.

Third Embodiment

Figure 4:
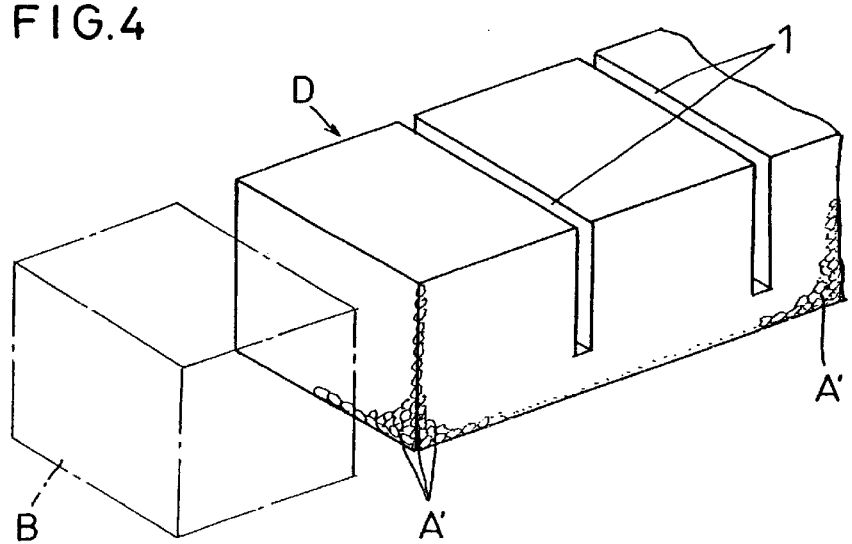
FIG. 4 is a perspective view of a frozen rod body which is a germinated brown rice processed food.

As shown in FIG. 4, following the same procedures as those in the second embodiment, a rod body D with slits 1 can be obtained. This rod body D can be divided into a plurality of block bodies B by the slits 1.

Needless to say, the plate body C or the rod body is refrigerated as in the case of the first embodiment.

A desired number of the refrigerated block bodies B or those divided from the plate body C or the rod body D as described above are mixed with polished rice to have a desired brown rice/polished rice ratio and the mixture is boiled.

Since the boiled or steamed germinated brown rice A' is boiled twice, the polished rice and the boiled or steamed germinated brown rice A' are softened to the same degree. Thus, when eating the mixture of the germinated brown rice and the polished rice, the mixture does not give the difference in palate.

The frozen block bodies, plate bodies and rod bodies may be transported and sold while being stored in a cold reserving case or an insulating case.

Further, it is not always necessary to freeze the boiled or steamed germinated brown rice A' mixed with the polished rice if used in a short time after boiled.

Fourth Embodiment

Figure 5:
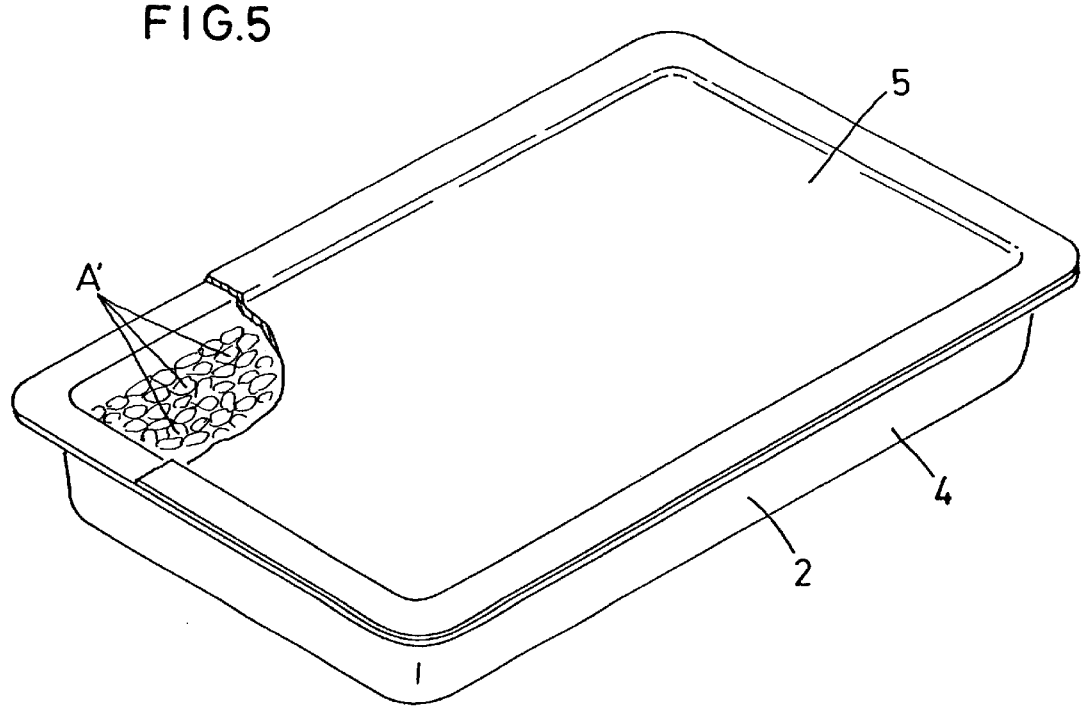
FIG. 5 is a partially-cut perspective view showing that boiled or steamed germinated brown rice is stored in a container.
Figure 6:
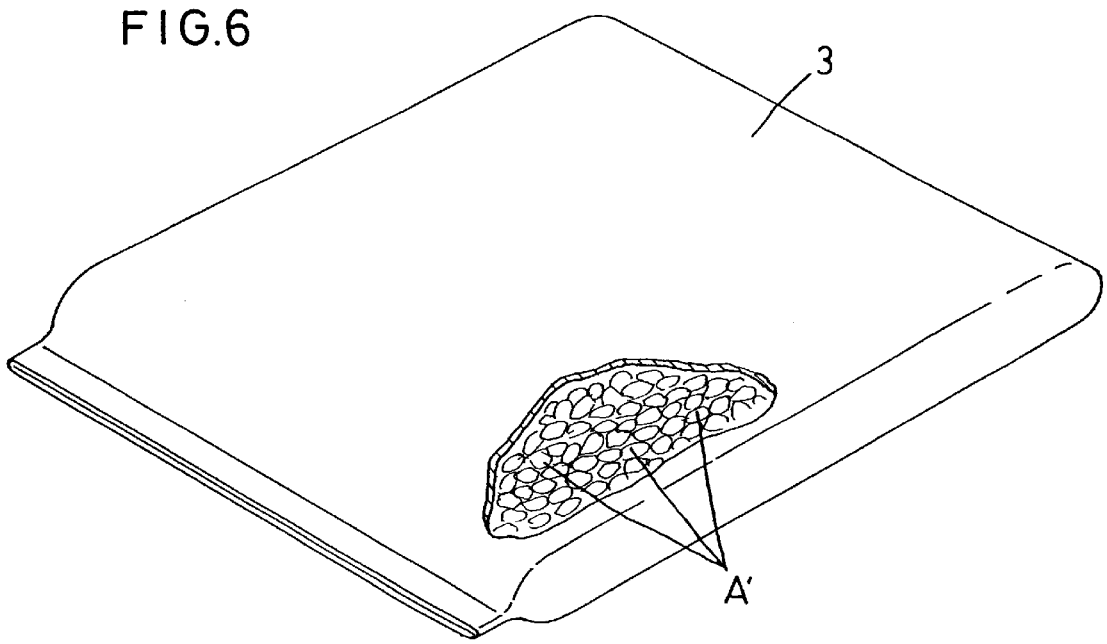
FIG. 6 is a partially-cut perspective view showing that boiled or steamed germinated brown rice is contained in a bag.

In fourth embodiment of the present invention, a preset amount of germinated brown rice A which has been germinated using an electric germinator or the like as well as water is put and boiled in a rice cooker (not shown). Thereafter, a predetermined amount of the boiled germinated brown rice A' is stored in a closed container 11 as shown in FIG. 5 or a bag 3 with a closed opening as shown in FIG. 6 and sold.

The container 2 consists of a box 4 sterilized in a well-known manner and made of, for example, synthetic resin and a lid 5. After filling a predetermined amount of boiled or steamed germinated brown rice A' in the box 4, the opening of the box 4 is closed by the lid 5. Then, the entire periphery of the surface on which the box 4 and the lid 5 overlap each other is airtight closed by heat welding to thereby prevent the invasion of fungus and preserve the boiled or steamed germinated brown rice A' for a certain period of time.

The bag 3 sterilized in a well-known manner and made of, for example, synthetic resin sheet is used. After filling a predetermined amount of boiled or steamed germinated brown rice in the bag 3, the opening of the bag 3 is airtight closed by heat welding or the like to thereby prevent the invasion of fungus and preserve the boiled or steamed germinated brown rice A' for a certain period of time.

The boiled or steamed germinated brown rice A' purchased in a shop and taken out from the container 2 or the bag 3 is boiled together with polished rice.

The surplus of the boiled or steamed germinated brown rice A' may be refrigerated.

According to the method of using germinated brown rice of the present invention, the boiled or steamed germinated brown rice is boiled together with polished rice, which means that the boiled or steamed germinated brown rice is boiled twice. Therefore, the softening degree of the polished rice and that of the germinated brown rice become equivalent.

Accordingly, there is no difference in palate between the germinated brown rice and the polished rice when the boiled germinated brown rice is eaten and the boiled germinated brown rice can be easily eaten. Besides, it is possible to eat only germinated brown rice returned to a boiled state by a microwave oven and to mix the germinated brown rice returned to a boiled state with just boiled polished rice. Therefore, this advantageously, greatly contribute to the spread of eating of germinated brown rice.

Furthermore, since the boiled or steamed germinated brown rice is frozen before divided into block bodies, sprouts do not continue to put out and a mixture ratio of germinated brown rice with polished rice can be freely changed by changing the number of block bodies.

Moreover, the plate body and the rod body can obtain the same advantages as described above.

The quantity of water for boiling, in particular, rice by mixing boiled or steamed germinated brown rice with polished rice may be the same as that for normally boiling polished rice.

This is because boiled or steamed germinated brown rice is used.

It is not, therefore, difficult to adjust the quantity of water as seen in the conventional case of boiling germinated brown rice with polished rice and the mixture of rice is appropriately boiled to thereby allow advantageously spreading eating of germinated brown rice.

Additionally, since germinated brown rice is sold while stored in a container or a bag, it is not necessary to refrigerate the germinated brown rice. Besides, after purchasing it, the germinated brown rice is taken out from the container or bag and can be boiled together with polished rice.

The quantity of water for boiling rice is the same as the quantity for boiling polished rice. It is, therefore, not necessary to adjust the quantity of water while estimating the quantity of water for boiling mixed, frozen germinated brown rice.

In addition, it is possible to thaw frozen germinated brown rice, return the thawed germinated brown rice to a boiled state by an microwave oven and to eat the steamed germinated brown rice as it is or to mix it with just boiled polished rice.

Figure 7:
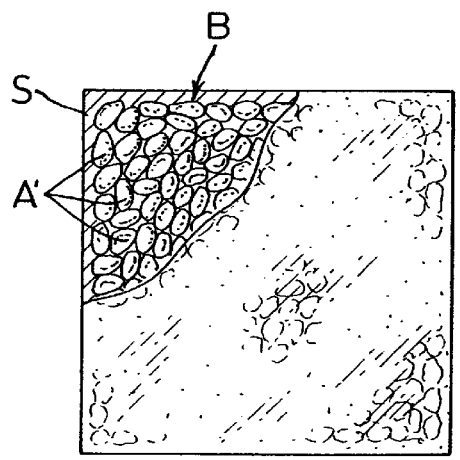
FIG. 7 is a perspective view of another example of a frozen block body which is a germinated brown rice processed food.
Figure 8:
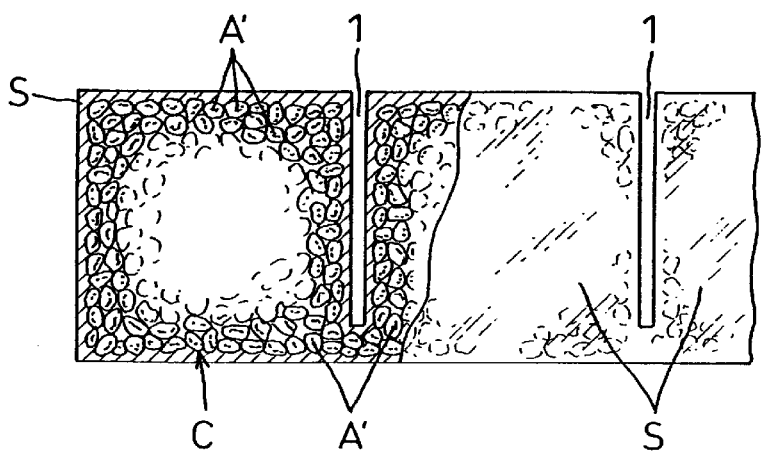
FIG. 8 is a perspective view of another example of a frozen plate body which is a germinated brown rice processed food.

FIGS. 7 and 8 show other examples of freeze-processings of the above-stated block body B, plate body C and rod body D. Namely, water is applied to the block body B, the plate body C or the rod body D from above and the water is frozen to thereby form an ice film S on the entire outer surface of each body. In this state, the entire block body B, the plate body C or the rod body D is frozen so that the entirety of the block body B, the plate body C or the rod body D turns into an ice block state.

To form the ice film S, tourmaline ore water, which is negative ionic water, is employed. The tourmaline ore water can be obtained by putting tourmaline ores in a container and boiling water injected into the container.

Figure 9:
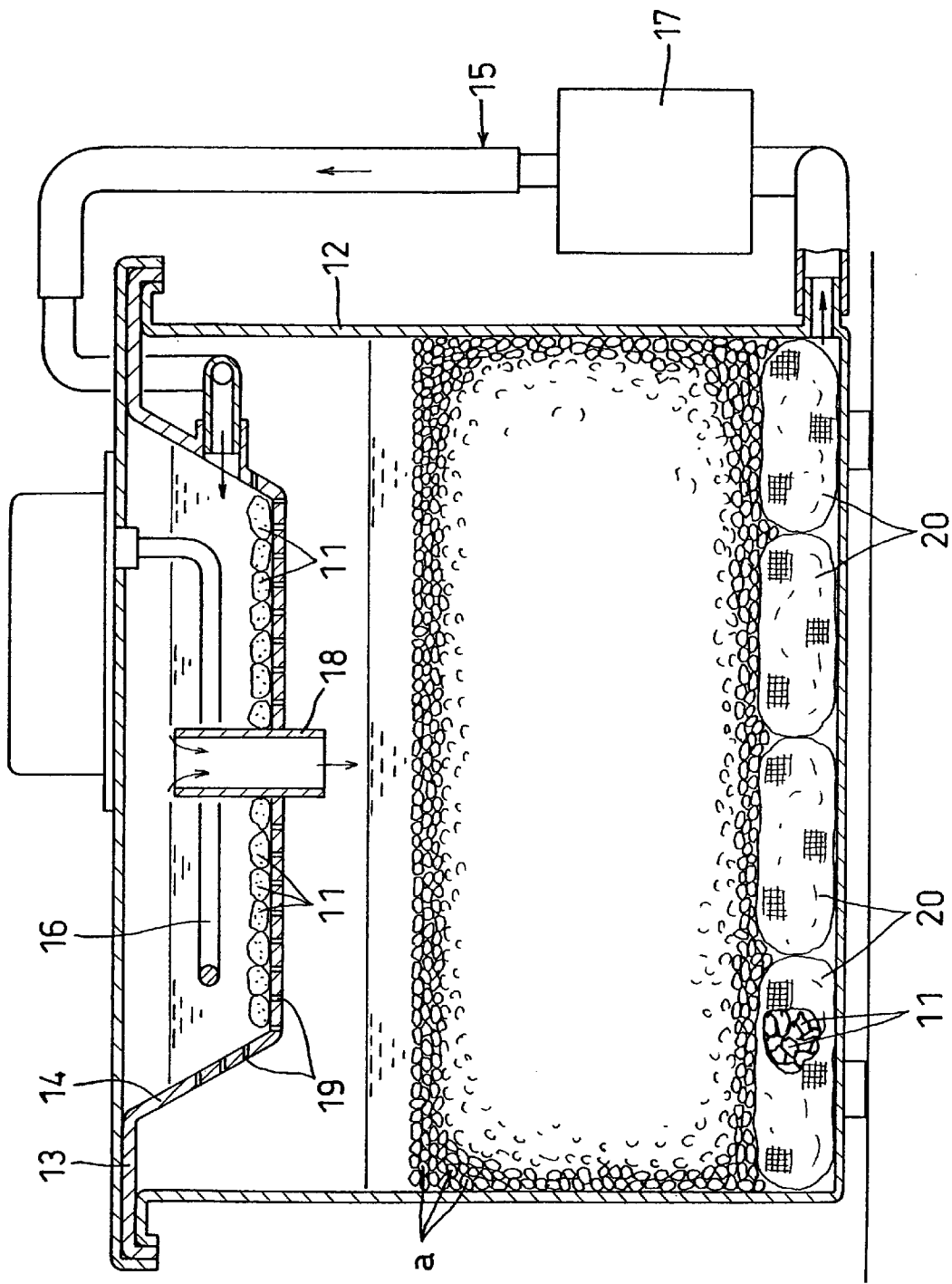
FIG. 9 is a longitudinal front view of a germination apparatus according to the present invention.
Figure 10:
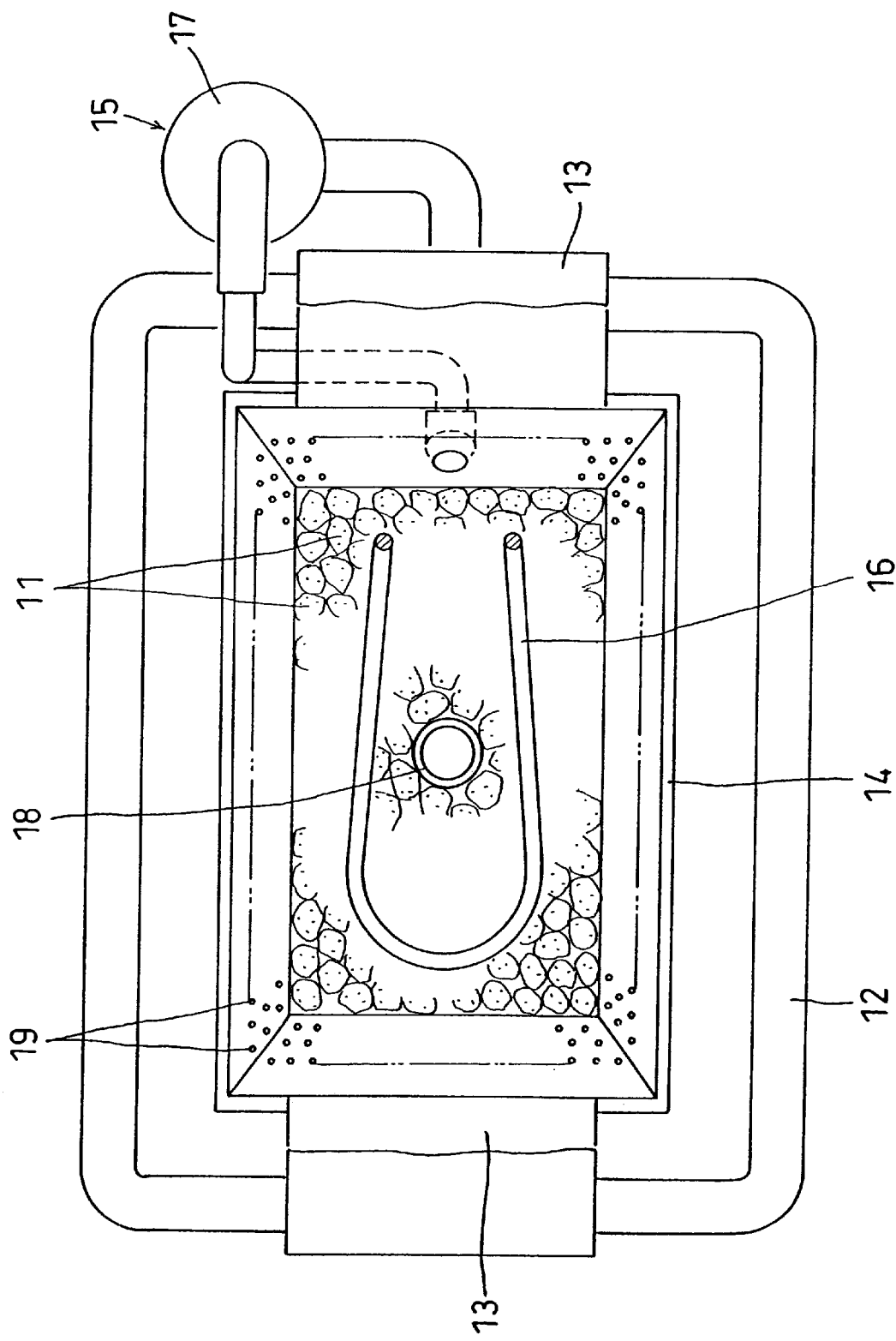
FIG. 10 is a plan view of FIG. 9.
Figure 11:
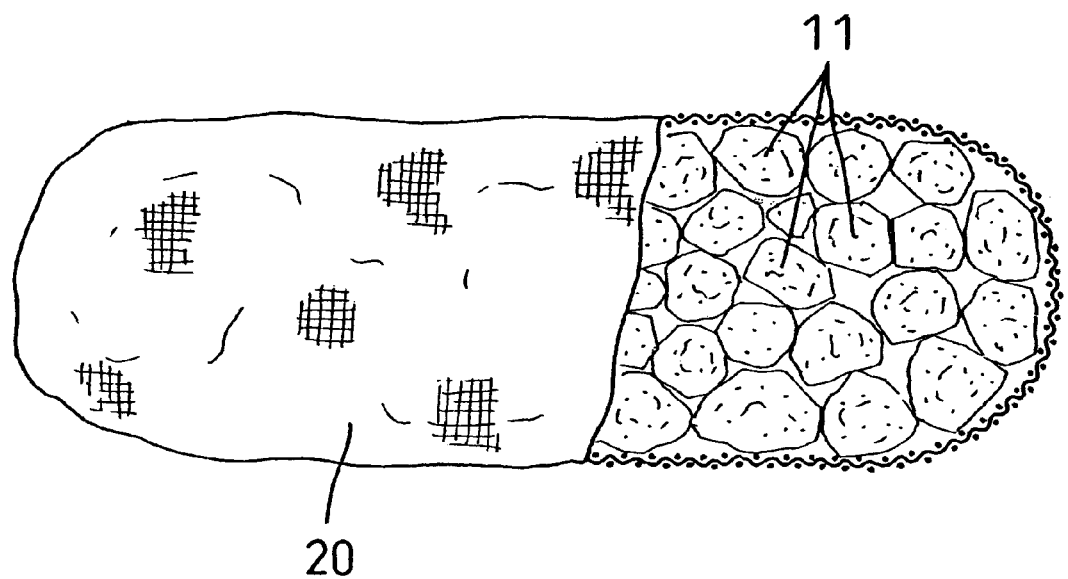
FIG. 11 is a partially-cut front view showing that tourmaline ores are stored in a bag.
Figure 12:
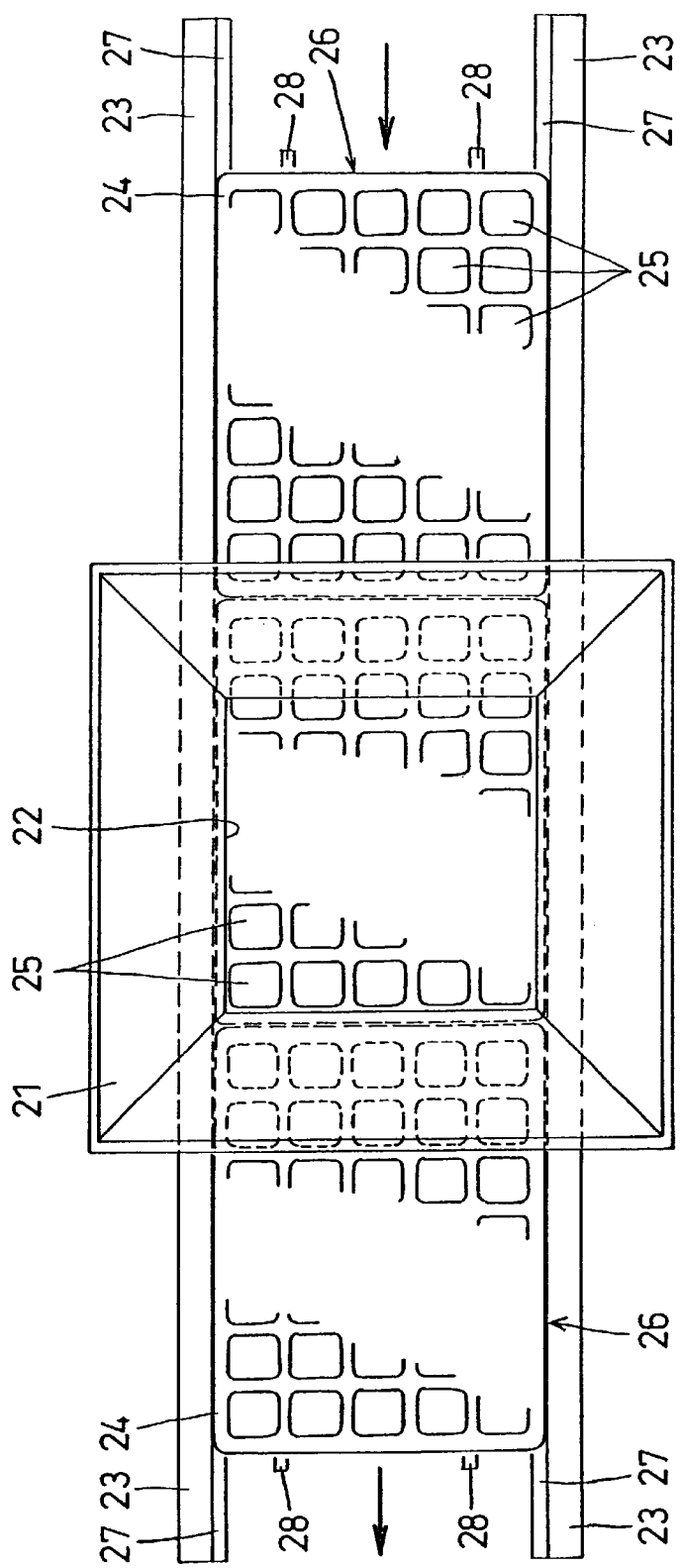
FIG. 12 is a plan view showing the first example of a filling apparatus according to the present invention.
Figure 13:
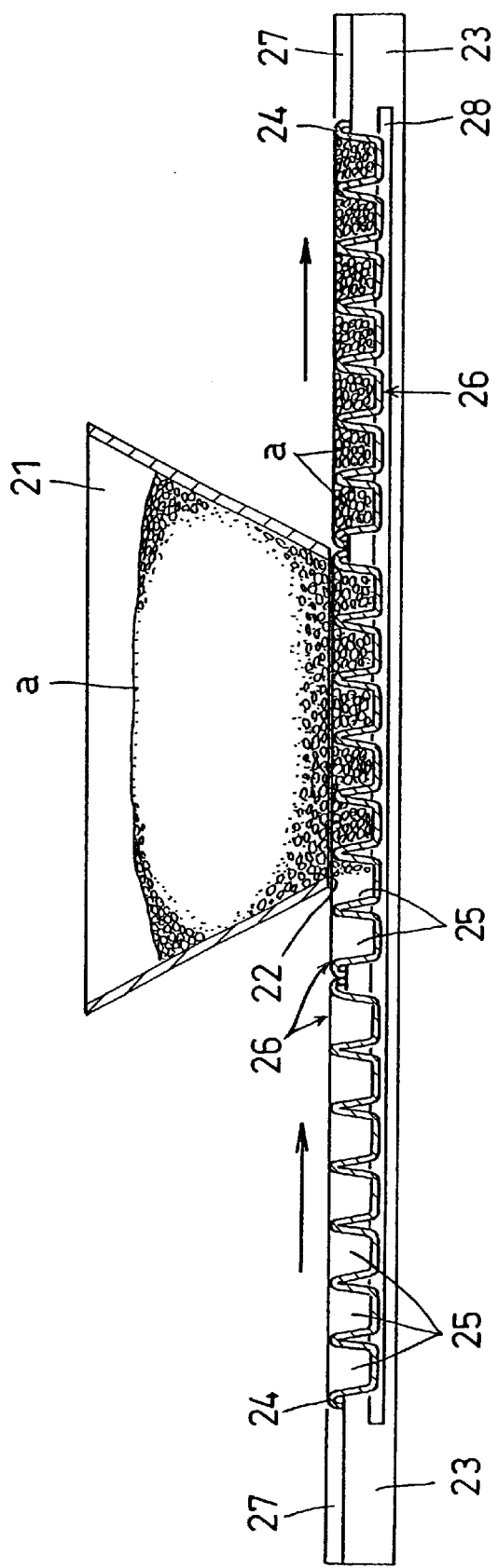
FIG. 13 is a longitudinal front view of FIG. 12.
Figure 14:
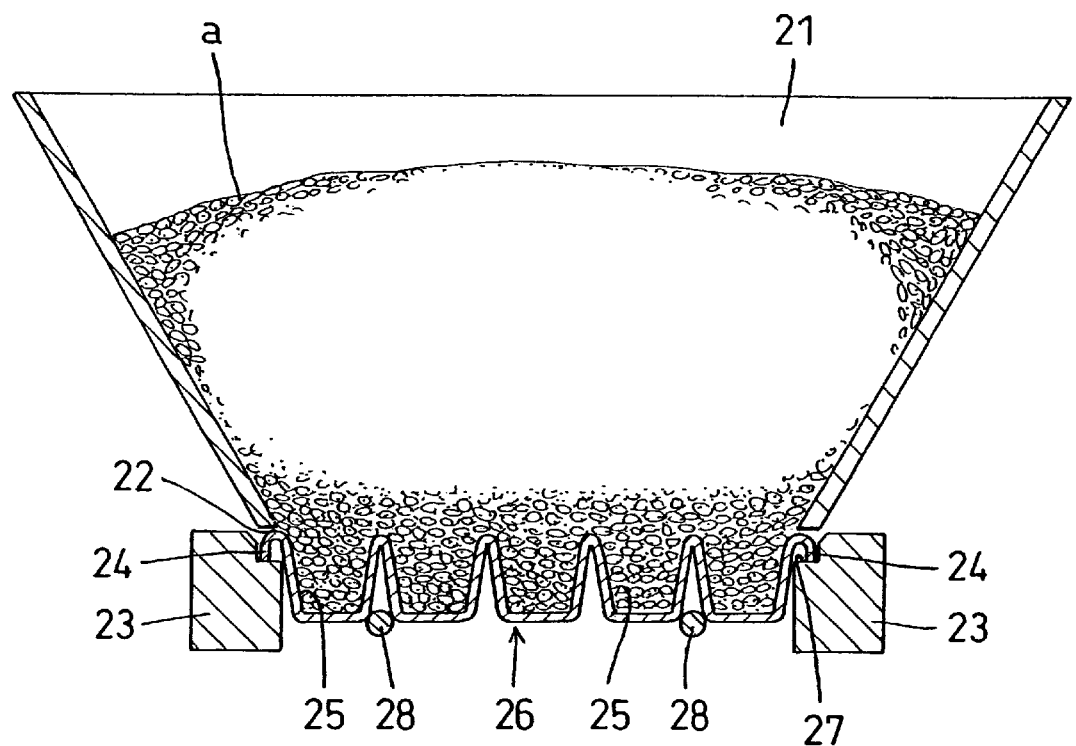
FIG. 14 is a longitudinal side view of FIG. 12.
Figure 15:
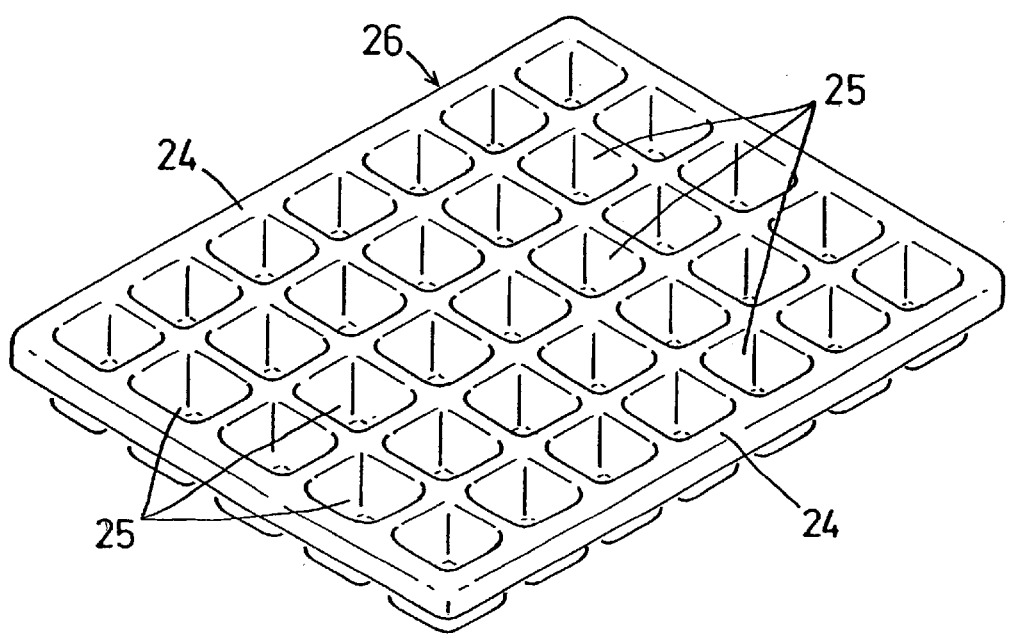
FIG. 15 is a perspective view of a tray-like container.

FIGS. 9 to 11 shows a germination apparatus for germinating brown rice while generating tourmaline ore water.

As shown therein, the germination apparatus consists of a water tank 12 storing brown rice a and tourmaline ore water which water is stored on the base thereof, a container 14 positioned just above the water tank 12, supported on the storage tank 12 by a surrounding flange 13, storing tourmaline ores 11 therein, generating tourmaline ore water and supplying the generated tourmaline ore water to the water tank 12, a processed water circulating path 15 circulating processed water between the water tank 12 and the container 14, and heating means 16 provided in the middle of the processed water circulating path 15, for heating the processed water at appropriate temperature.

The processed water circulating path 15 is formed to connect the lower portion of the water tank 12 to the interior of the container 14 by a pipeline 16 and to be equipped with a pump 17 in the middle of the pipe line 16, for pumping up and circulating the processed water within the water tank 12. The heating means 16 is formed out of a heater installed in the container 14.

In addition, the container 14 is provided with an outflow cylinder 18 having a lower end opened into the water tank 12 and discharging pouring tourmaline ore water within the container 14 to the water tank 12 and also provided with numerous small holes 19 on the base and peripheral wall of the container 14.

In the above-stated germination apparatus, when the pump 17 is actuated, the processed water within the water tank 12 flows in the container 14 through the pipeline 16, the processed water within the container 14 contacts with the tourmaline ores 11, generated tourmaline ore water flows from the small holes 19 down to the water tank 12 and the tourmaline ore water flowing out of the upper end of the outflow cylinder 18 flows in the water tank 12 through the outflow cylinder 18.

While the above-described processed water circulating path 15 adopts a system of mounting the container 14 on the water tank 12, such a system as to put the container 14 in another place and to connect the container 14 to the water tank 12 by a horse or a pipe through the pump may be adopted.

Furthermore, while the heater is arranged as the processed water heating means 16 above the tourmaline ores 11 spread in the container 14. as shown in the drawings, a heating system for heating processed water to about 30° C. may be arranged in another region.

If the germination apparatus is constituted as stated above, then the brown rice a stored in the water tank 12 is dipped in the tourmaline ore water generated out of the tourmaline ores 11, the tourmaline ore water is circulated and the brown rice a is germinated in about 24 hours.

It is noted that tourmaline ore water can be extracted better since the circulating processed water is heated by the heater.

If the tourmaline ores 11 stored in the water tank 12 are stored in a bag 20 having water permeability as shown in FIG. 11, the tourmaline ores 11 can be recovered by taking out the bag 20. This facilitates taking germinated brown rice in and out of the tank 12.

Needless to say, if the tourmaline ores 11 stored in the bag 20 are bedded on the base of the water tank 12, it is possible to prevent the germinated brown rice within the water tank 12 from directing toward the processed water circulating path 15.

A net may be provided at the outlet of the processed water circulating path 15 of the water tank 12.

Since the block body, the plate body or the rod body is frozen with an ice film formed on the surface thereof as stated above, the germinated brown rice at the surface layer side which are gathered together because of being frozen, does not separate from the remainder.

Accordingly, it is possible to maintain a fixed amount of rice, to avoid making the boiled rice appear clumsy and to improve operativity such as that of packaging operation. In addition, it is possible to prevent the progress of oxidation of, in particular, the germinated brown rice and to advantageously contribute to further promoting health and treating various types of diseases in cooperation with the tourmaline ore water effective for cleaning away waste matters of human bodies.

Further, since the tourmaline ores are used in germination, it is possible to minimize the generation of foam during germination and to eliminate disadvantages caused by the outflow of foam.

In addition, since the tourmaline ores used in germination are stored in the bag, smooth operation for recovering tourmaline ores can be ensured.

Needless to say, ores can be employed loose and germinated brown rice can be stored in a bag.

Next, FIGS. 12 to 18 show the first example of a filling apparatus for automatically filling germinated brown rice in a container 18 having storage recessed portions.

The filling apparatus as the first example shown in FIGS. 12 to 15 consists of a hopper 21 into which germinated brown rice is inputted, a pair of guide rails 23 aligned at positions below and at the both sides of the germinated rice dropping port 22 of the hopper 21, and tray-like containers 26 each having a flange 24 protruding from the upper outer periphery thereof and slidably supported by the pair of guide rails 23 in the length direction of the rails 23, and having recessed portions 25 for storing the germinated brown rice. The hopper 21 is arranged so that the lower edge of the germinated brown rice dropping port 22 is in the vicinity or in contact with the upper surface of a tray-like container 26 positioned on the guide rails 23.

In case of FIGS. 12 to 15, the storage recessed portions 25 are aligned in large number sporadically in horizontal and vertical directions and germinated brown rice a is filled, in a block shape, in the recessed portions. Alternatively, a plurality of groove-like recessed portions may be aligned and filled with germinated brown rice in a plate or rod shape. The tray-like container 26 is formed of synthetic resin or a metallic press-molded matter.

In short, when the tray-like container 26 passes below the dropping port 22 of the hopper 21, the germinated brown rice a within the hopper 21 is filled in the respective recessed portions 25. The surplus of the germinated brown rice filled is scraped away by the edge of the port 22 to thereby flatten the filled rice.

In case of FIGS. 12 to 15, the width of the tray-like container 26 in a direction perpendicular to the travelling direction thereof is set almost the same as the width of the dropping port 22 in the width direction thereof and the width of the tray-like container 26 in vertical direction thereof is set larger than the width of the dropping port 22 in the vertical direction thereof. However, dimensions are not specially limited.

The guide rails 23 receiving the flange 24 are provided with an L-shaped stepped portion 27 at the internal angle of the upper surfaces of the rails 23 and the flange 24 is forced in to the stepped portion 27 to thereby restrict the horizontal movement of the rails 23.

Reference number 28 denotes a rail fitted into a groove formed between the storage recessed portions 25 on the lower surface of the tray-like container 26 to allow the tray-like container to slide stably.

If the filling apparatus is constituted as stated above, then a tray-like container 26 is mounted on the guide rails 23 in front of the hopper 21 and the next container 26 is manually moved forward.

By moving so, the front container 26 is forced into the dropping port 22 of the hopper 21. Following this, germinated brown rice a flows in and filled in the respective storage recessed portions 25 of the tray-like container 26 passing below the dropping port 22.

The surplus of the germinated brown rice a on the tray-like container 26 passing below the dropping port 22 is scraped away by the lower edge of the port 22.

The tray-like container 26 passing below the dropping port 22 and having the respective storage recessed portions 25 filled with the germinated brown rice a, is removed from the guide rails 23.

If the germinated brown rice a inputted into the hopper 21 has been pretreated, i.e., boiled or steamed, water for forming an ice film on the upper surface of the tray-like container 26 is added to the tray-like container 26 thus removed from the guide rails 23 and a freeze processing is conducted so that an ice film is formed on the block bodies formed by the recessed portions 25 while the filled, germinated brown rice a is frozen.

Thereafter, the tray-like container 26 which has been frozen is dipped in hot water, the tray-like container 26 is thwarted by a heat source such as a heater to facilitate removing the rice. Then, a preset amount of germinated brown rice of ice block shape taken out from the tray-like container 26 is packaged and refrigerated.

Further, other germinated brown rice a which has not been pretreated is inputted into the hopper 21 and filled in the respective recessed portions 25 of the tray-like container 26 following the above-stated procedures. Then, the germinated brown rice a is subjected to a steam processing, a cooling processing, a water addition processing and a freeze processing to thereby obtain a block body having an ice film formed thereon. These series of processings may be conducted under automatic control.

Figure 16:
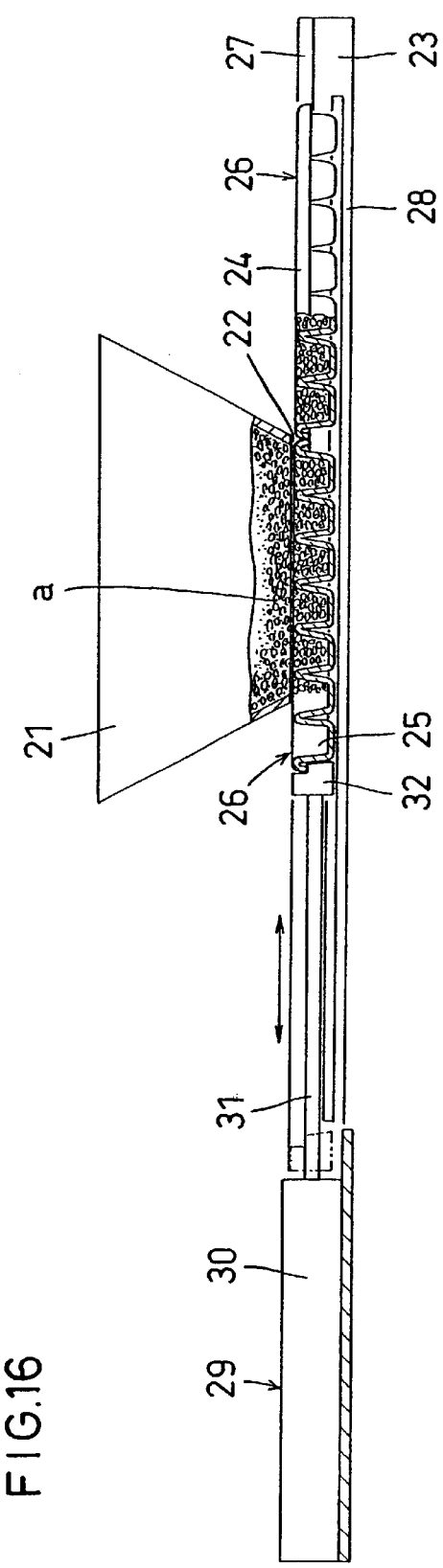
FIG. 16 is a longitudinal side view showing the second example of a filling apparatus according to the present invention.

A filling apparatus as the second example shown in FIG. 16 has a push-in device 29, provided in front of a hopper 21, for pushing a tray-like container 26 mounted on guide rails 23 into a dropping port 22.

In FIG. 16, the push-in device 29 consists of a cylinder 30, a piston rod 31 ascending and descending in response to the action of the cylinder 30 and a picking material 32 provided on the tip end of the piston rod 31. The push-in device 29 having a different constitution may be used to push in the tray-like container 26.

If the filling apparatus is constituted as stated above, then the tray-like container 26 mounted on the guide rails 23 is pushed in the dropping port 22 by the push-in device 29 and the next tray-like container 26 is pushed in the dropping port 22, whereby the front tray-like container 26 positioned below the port 22 is pushed forward and passes below the port 22.

Figure 17:
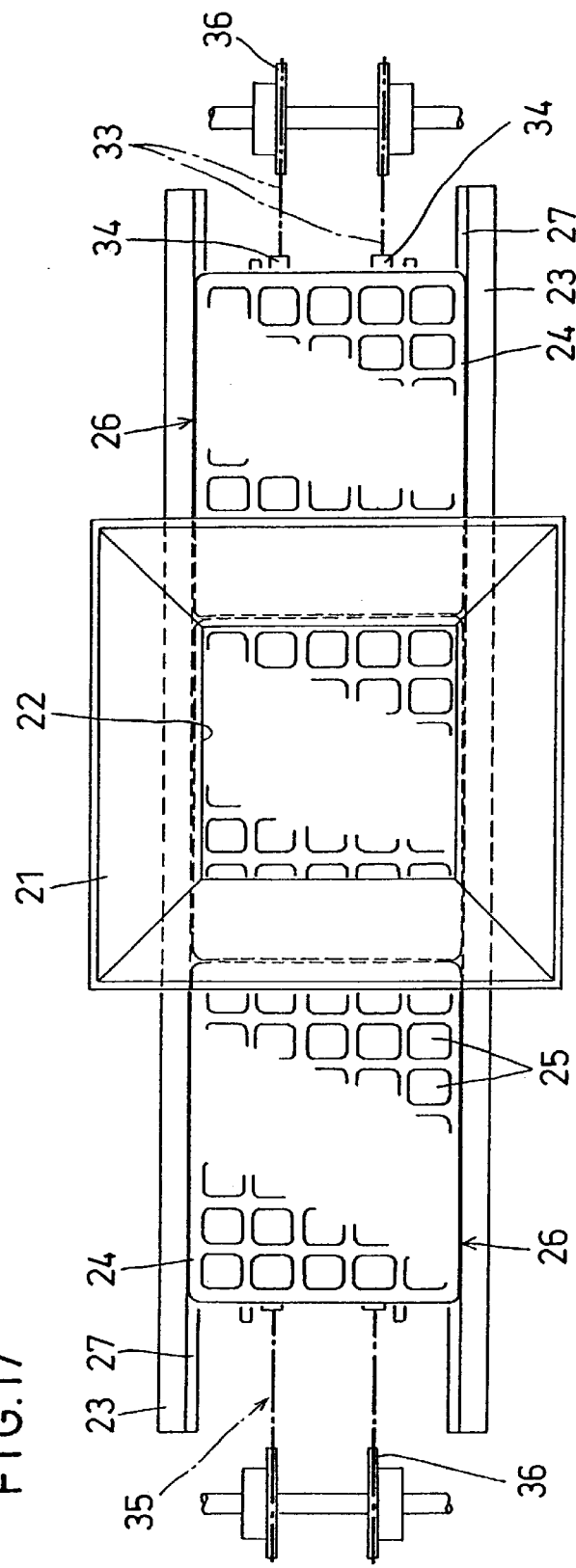
FIG. 17 is a plan view showing the third example of a filling apparatus according to the present invention.
Figure 18:
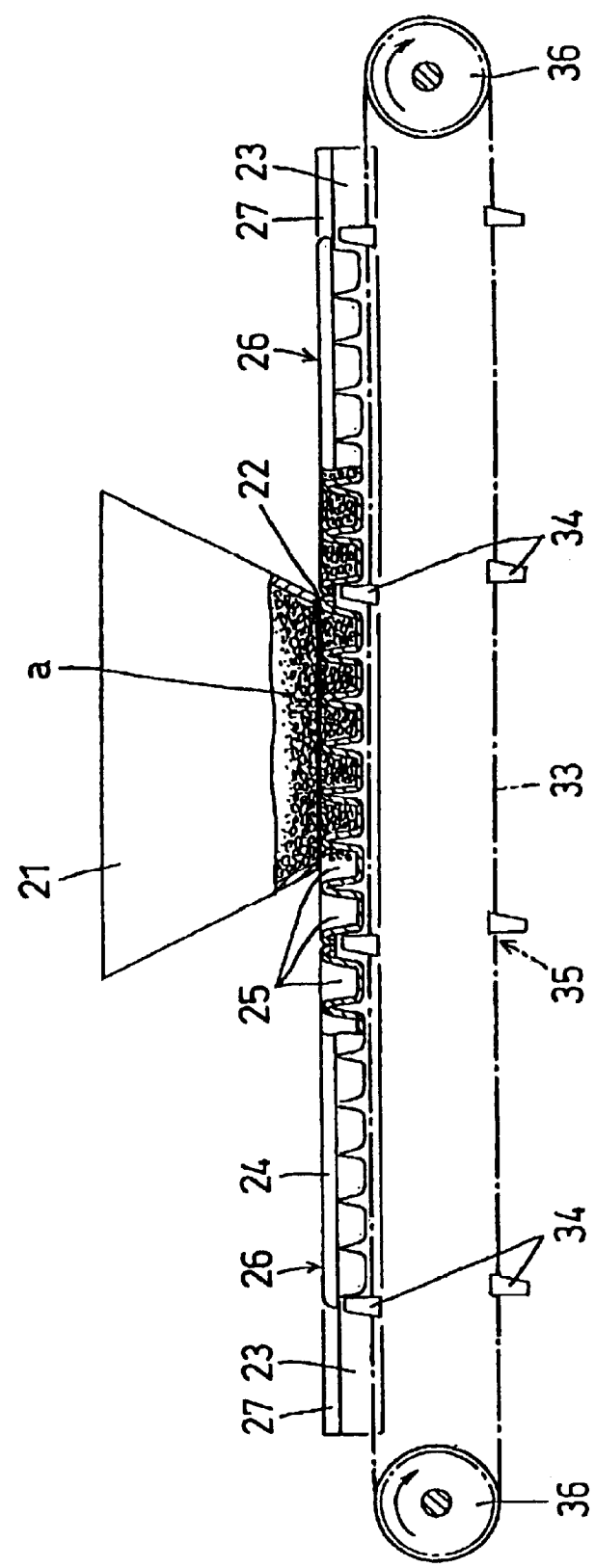
FIG. 18 is a longitudinal front view of FIG. 17.

A filling apparatus as the third example shown in FIGS. 17 and 18 has a feed mechanism 35 provided along the travelling line of a tray-like container 26 and consisting of an endless travelling body 33 and claws 34 provided equidistantly to engage with the tray-like container 26.

The travelling body 33 is formed by spreading a chain over a sprocket 36 having motor-driven function at one side. The claws 34 are engaged with protruding base walls forming the recessed portions 25 of the tray-like containers 26. Each claw 34 has a pitch equal to the length of the tray-like container in travelling direction.

Then, the base walls are engaged with the claws 34, thereby feeding and passing the tray-like container 26 below the dropping port 22.

Needless to say, the respective recessed portions 25 of the tray-like container 26 are filled with germinated brown rice a by automatic feeding in the second and third examples, as in the case of the first example.

As stated above, the filling apparatus pushes the tray-like container 26 into the dropping port 22 of the hopper 21 and allows the container 26 to pass below the port 22. By doing so, the filling apparatus can automatically fill the respective recessed portions 25 of the tray-like container 26 with germinated brown rice and greatly enhance the productivity of frozen germinated brown rice.

Furthermore, using the push-in mechanism or the feed mechanism, the tray-like container 26 is automatically pushed in the dropping port 22 and passes below the port 22. Thus, it is possible to dispense with manual operation and to greatly improve filling operation.

What is claimed is:

1. A method of using germinated brown rice comprising:

boiling or steaming germinated brown rice;

when boiling a polished rice, mixing said boiled or steamed germinated brown rice with polished rice so as to provide a desired ratio of brown rice to polished rice; and boiling the boiled or steamed germinated brown rice and the polished rice together.

* * * * *